UNITED STATES PATENT OFFICE.

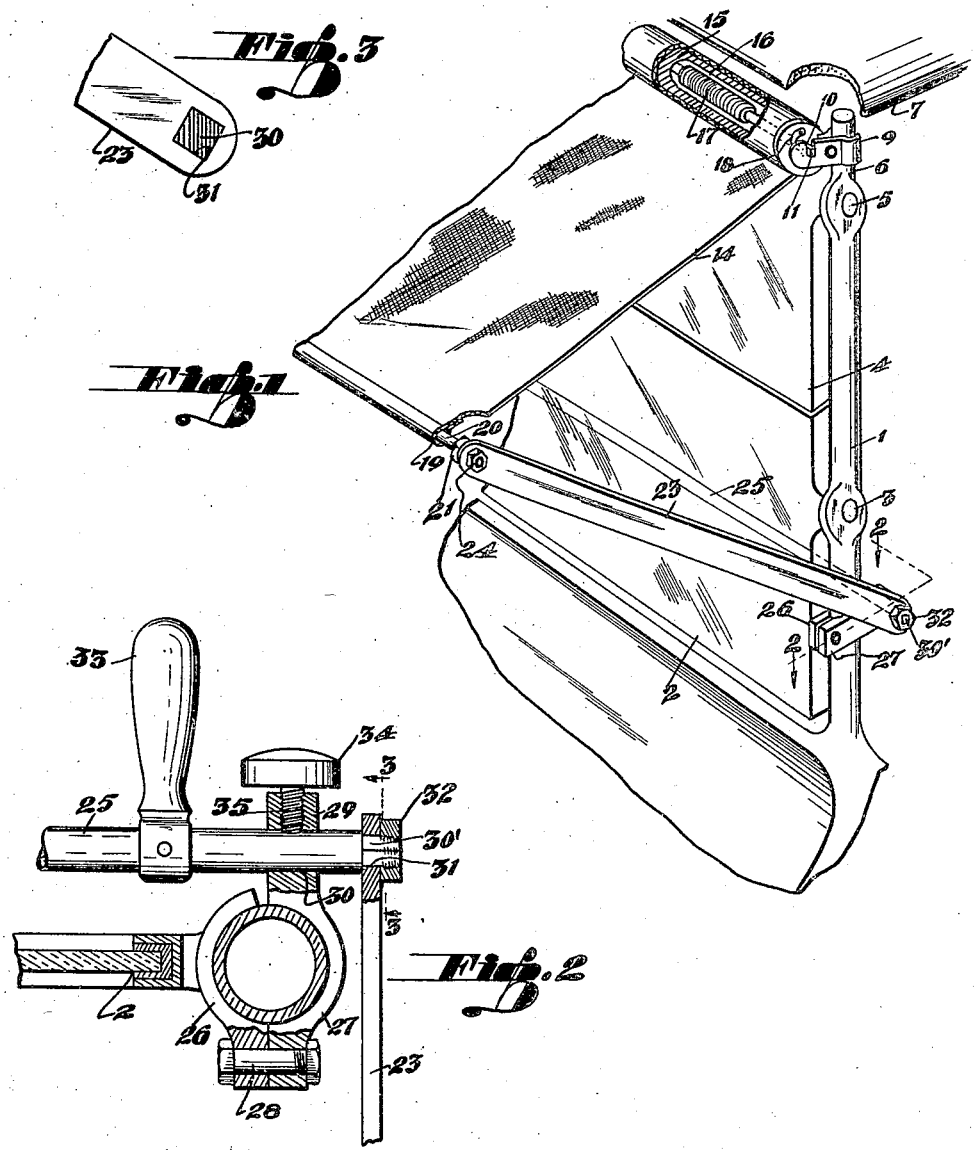

GEORGE HARROLD, OF LOS ANGELES, CALIFORNIA.

ADJUSTABLE CURTAIN FOR WINDSHIELDS.

1,410,529.

Specification of Letters Patent. Patented Mar. 21, 1922.

Application filed September 23, 1920, Serial No. 412,114. Renewed February 1, 1922. Serial No. 533,415.

*To all whom it may concern:*

Be it known that I, GEORGE HARROLD, a citizen of the United States, residing at Los Angeles, in the county of Los Angeles and State of California, have invented new and useful Improvements in Adjustable Curtains for Windshields, of which the following is a specification.

It is the object of this invention to provide an adjustable curtain for a windshield forming an improvement over the construction such as described and claimed in my Patent No. 1309133 of July 8, 1919.

The present invention contemplates the provision of improved means for actuating the curtain and retaining the same in adjusted positions.

The invention will be readily understood from the following description of the accompanying drawings, in which—

Figure 1 is a perspective showing my adjustable curtain in position for use in relation to a windshield.

Fig. 2 is a transverse section on the line 2—2 of Fig. 1.

Fig. 3 is a detail section on the line 3—3 of Fig. 2.

In the form of windshield shown, a post 1 extends upwardly at each end of the windshield and the lower half 2 of the windshield is mounted upon trunnions 3 extending into the posts and the upper half 4 of the windshield is mounted upon trunnions 5 extending into bearings at the upper ends of the posts. Arms 6 extend upwardly from the posts 1 above the trunnions 5 and the automobile top construction 7 is attached to these arms.

Curtain brackets 9 are secured to the arms 6, said brackets being substantially alike with the exception that one of the brackets (not shown) has a bearing for the rotating pintle of the curtain, and the other bracket has a slotted bearing 10 to receive the squared pintle 11 and hold the pintle from rotation, as required to hold one end of the spring.

The curtain 14 is mounted to wind upon a spring roller 15, there being a socket 16 in one end of the roller, the body of the pintle 11 extending into the socket 16, and a coil spring 17 having one of its ends connected to the body of the pintle and the other end connected to the roller. The spring roller 15 is provided with the usual centrifugal pawl construction 18.

The forward edge of the curtain 14 is doubled upon itself and stitched to form a loop 19 and a rod 20 is inserted through this loop, both ends of the rod being screw-threaded. Jam nuts 21 are placed upon the screw-threaded ends of the rod. Curtain swinging arms 23 are formed of strap iron cut to the desired length and bolt holes are formed in each of their ends. The arms 23 are placed in position against the jam nuts 21 and retaining nuts 24 are applied to the outer ends of the rod against the arms.

A rock rod 25 extends across the windshield in rear of the same and is journaled in brackets carried by the respective post 1. These brackets are shown as comprising clamping jaws 26—27 adapted to be connected by bolts 28 for clamping the brackets upon the posts 1. One of the jaws of each bracket extends rearwardly as shown at 29 and is provided with a bearing 30 in the rock rod. The arms 23 are fixed to rock rod 25 as by providing squared ends 30' upon the rock rod adapted to receive similar squared apertures 31 in the arms. The arms may be retained in position relative to the rock rod by means of nuts 32 threaded on to the ends of the rock rod beyond the squared portions 30' thereof.

The rock rod is arranged to be manually turned in its bearings in order to swing arms 23 and thereby raise or lower the curtain. For this purpose a handle 33 projects laterally from the rock rod, preferably, adjacent one end thereof. The rock rod may be clamped in adjusted positions by means of a set screw 34 threaded through one of the bracket projections 29 as shown at 35, said set screw engaging the rock rod.

By the construction as thus set forth it will be seen that the curtain may be readily adjusted by actuating rock rod 25, said rod being conveniently operated from the handle 33 positioned at one end thereof. The set screw 34 will also provide means for positively clamping rock rod 25 so as to retain the curtain in adjusted positions.

Various changes may be made without departing from the spirit of the invention as claimed.

What is claimed is:

1. An adjustable curtain construction including a movable curtain, arms secured to said curtain, bearing supports for the opposite ends of said arms, a rock rod journaled in said bearing supports and fixed to said arms, a handle for swinging said rod, and means for locking said rod in adjusted positions arranged adjacent said handle.

2. An adjustable curtain construction including a spring roller, a curtain upon the same, transversely spaced curtain moving arms secured to said curtain, supporting brackets forming bearings, a transversely extending rock rod journaled in said bearings, said arms being fixed to said rod, a handle for swinging said rod, and a hand set screw adjacent said handle and extending through one of said brackets and engaging said rod.

In testimony whereof I have signed my name to this specification.

GEORGE HARROLD.